United States Patent
Kwon et al.

(10) Patent No.: US 9,253,191 B2
(45) Date of Patent: Feb. 2, 2016

(54) METHOD FOR GENERATING SMART CONTENTS, METHOD FOR EXECUTING SMART CONTENTS AND METHOD FOR PROVIDING N-SCREEN SERVICE OF SMART CONTENTS

(71) Applicant: Electronics and Telecommunications Research Institute, Daejeon (KR)

(72) Inventors: Hyeok Chan Kwon, Daejeon (KR); Seungmin Lee, Daejeon (KR); Sokjoon Lee, Daejeon (KR); Yong Hyuk Moon, Daejeon (KR); Dong Il Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 543 days.

(21) Appl. No.: 13/682,643

(22) Filed: Nov. 20, 2012

(65) Prior Publication Data
US 2013/0167248 A1    Jun. 27, 2013

(30) Foreign Application Priority Data
Dec. 27, 2011    (KR) .................. 10-2011-0143601

(51) Int. Cl.
*H04L 29/06*    (2006.01)
(52) U.S. Cl.
CPC ........... *H04L 63/10* (2013.01); *H04L 2463/101* (2013.01)

(58) Field of Classification Search
CPC .................. H04L 63/10; H04L 2463/101
USPC ................................. 726/25, 26, 27
See application file for complete search history.

(56) References Cited

U.S. PATENT DOCUMENTS

| | | |
|---|---|---|
| 2005/0050446 A1 | 3/2005 | Miura et al. |
| 2008/0120241 A1 | 5/2008 | Kim |
| 2008/0244564 A1* | 10/2008 | Sonkin et al. ................ 717/175 |
| 2012/0090034 A1* | 4/2012 | Kang et al. ..................... 726/26 |
| 2013/0047264 A1* | 2/2013 | Bjorkengren et al. ......... 726/27 |

FOREIGN PATENT DOCUMENTS

| | | |
|---|---|---|
| JP | 2004-264898 A | 9/2004 |
| KR | 1020060105934 A | 10/2006 |
| KR | 1020080044481 A | 5/2008 |
| KR | 1020090063383 A | 6/2009 |

OTHER PUBLICATIONS

Gelareh Taban et al., "Towards a Secure and Interoperable DRM Architecture", Proceedings of the ACM workshop on Digital rights management, 2006, pp. 69-78.

\* cited by examiner

*Primary Examiner* — Jeffrey Pwu
*Assistant Examiner* — Nega Woldemariam

(57) ABSTRACT

A method for generating smart contents includes contents protected by a digital right management (DRM) technology; and metadata including information necessary to use the contents. Further, the method includes a smart code for protecting copyright of the contents and position information which the smart code is downloaded.

9 Claims, 6 Drawing Sheets

FIG.4

| FiLled name | Type | Description |
|---|---|---|
| Version | Unit | VERSION OF SMART CONTENTS |
| CreatorId | Unit | IDENTIFIER OF SMART CONTENTS GENERATOR |
| SmartCodeType | Unit | SMART CODE TYPE<br>•0X01: NON EXECUTABLE FILE<br>•0X02: EXECUTABLE FILE<br>•0X03: INSTALLABLE FILE<br>•0X04: URI INFORMATION |
| SmartCodeId | Unit | IDENTIFIER OF SMART CODE |
| SmartCodeSize | Unit | Smart Code Size |
| DRMInfo | Var | INFORMATION OF DRM AGENT APPLIED IN TYPE OF SMART CODE, WHICH IS CONFIGURED WITH ADDITIONAL METADATA AS FOLLOWS<br>•DRM AGENT IDENTIFIER<br>•VERSION |
| ContentMediaType | Unit | MEDIA TYPE OF PROTECTED CONTENTS (MIME MEDIA TYPE). EX) VIDEO/H.264 |
| ServiceProvider_Id | Unit | SIZE OF PROTECTED CONTENTS (DRM CONTENTS) |
| SmartCodeSize | Unit | IDENTIFIER OF SP(SERVICE PROVIDER) |
| SmartContentAuth Type | Unit | SMART CONTENTS AUTHENTICATION METHOD<br>•0X01: CODE SIGNING |
| SigningParameter | Var | SIGNATURE INFORMATION OF SMART CONTENTS, WHICH IS CONFIGURED WITH ADDITIONAL METADATA AS FOLLOWS<br>•SIGNING ALGORITHM<br>•THE KEY SIZE<br>•SIGNING MODE<br>•OTHER PARAMETER SET |
| PlayerList | Var | PLAYER LIST TO ALLOW INTERWORKING TO DRIVE RM CONTENTS |
| SmartCodeData | Var | SMART CODE DATA (BODY) |
| Protected ContentData | Var | PROTECTED CONTENTS(DRM CONTENTS) DATA(BODY) |
| SmartContent Signature | Var | SMART CONTENTS CODE SIGNATURE (SIGNED HASH VALUE) |

METHOD FOR GENERATING SMART CONTENTS, METHOD FOR EXECUTING SMART CONTENTS AND METHOD FOR PROVIDING N-SCREEN SERVICE OF SMART CONTENTS

CROSS-REFERENCE TO RELATED APPLICATION(S)

The present invention claims priority of Korean Patent Application No. 10-2011-0143601, filed on Dec. 27, 2011, which is incorporated herein by reference.

FIELD OF THE INVENTION

The present invention relates to copyright protection of multimedia data; more specifically, to a method for playing contents through N-screen service by generating copyrighted contents, sharing and distributing same to enable the N-screen service for the contents to be protected by copyright.

BACKGROUND OF THE INVENTION

As well known in the art, digital right management (hereinafter referred to as 'DRM') technology is a technology which manages copyright of digital works, and may be used by only an authorized user. Further, the DRM technology may limit how to use, the number of usage, duration and the like according to information such as permission limitation (condition).

The structure and the name of each object in the DRM technology are slightly different depending on various standards and commercial products, but the basic structure and operation method are very similar to each other.

The term of 'N-screen' is a technology or a service that one multimedia contents, e.g., movies, music and the like may be continuously enjoyed on the N number of devices. For example, the N-screen allows a broadcast or a movie being watched on TV at home to continuously watch through a smartphone or a tablet PC (or a notebook). That is, the following scenes from the last watched scene may be watched on the N number of any devices. Further, it is possible to y watch additional information, e.g., unpublished images, location/props Information and the like through the smartphone or the tablet PC.

The N-screen is a kind of cloud service that users store formally purchased multimedia contents not in their IT device but in a media sever of their own mobile carrier and access to the media server through internet when necessary. Therefore, the users may watch the multimedia contents anytime, anywhere whenever any one of the tablet PC or the smart phone.

On the other hand, when the N-screen service based on the digital rights management technology needs to be provided, some problems may occur.

The most important module in the DRM technology is a DRM agent. In order to use the protected contents, the DRM agent acquires a permission object (or license) by contacting with a rights issuer, and controls such that the multimedia contents may be used depending on the given conditions based on the acquired permission object (or license). The original contents protected by the DRM may be leaked when the DRM agent is exposed by attacks such as hacking. Therefore, it is essential that environment for safely driving the DRM agent be provided.

Because of security reasons described above, the DRM agent is typically mounted on the platform of the terminal, thus the DRM technology is dependent on the terminal. Because of characteristic in which the DRM technology is dependent on the terminal as described above, installing a new DRM agent takes a lot of work and cost. Actually, a lot of effort and time corresponding to, e.g., firmware update or operating system upgrade costs to load a new DRM agent on the platform of the terminal. Currently, dozens of standards for the DRM technologies exist. Further, if a service provider or a developer is different, developed DRM technology become also different even in the same standard, thus numerous DRM technologies currently exist.

In order to share the copyrighted contents on various terminals, the same DRM needs to be loaded on each. However, such reasons described above, i.e., increase in time and cost when installing the new DRM, which is caused by the presence of numerous DRM technologies and the terminal-dependent characteristic of the DRM makes it difficult to share the copyrighted contents through the N-screen.

The scenarios of problems which may occur when such copyrighted contents need to be shared through the N-screen is as follows. For example, Mary and John purchases smartphones in which an OMA (Open Mobile Alliance) DRM is loaded with built-in, and they would receive the N-screen service for a copyrighted educational video at home. Here, the educational video which John wants to watch is Widevine DRM-protected video, and the educational video which Mary wants to watch is Microsoft DRM-protected video. At this time, because the smartphones purchased by Mary and John and DRM formats of the educational video are different from each other, these educational videos may not be serviced through the smartphones purchased by Mary and John.

In reality, it is difficult for a manufacturer the smartphone to individually load the DRM necessary to the environment of a buyer when they release the smartphone, and also difficult for the manufacturer to additionally and separately load the DRM after the smartphone, i.e., a terminal is released. Finally, Mary and John may not receive the copyrighted educational video protected by the DRM which they want through the N-screen service.

Due to the reasons described above, the N-screen is mainly serviced for free contents that is not protected by copyright of, the N-screen is a very limitedly serviced (e.g., only if the terminal is a particular operator's service terminal and a specific manufacturer's terminal, it is possible to share the copyrighted contents) even if the N-screen is serviced for the copyrighted contents.

As the conventional technology for sharing the copyrighted contents, there are t DRM-compatible technologies such as Coral, EXIM using a DRM conversion and the like.

The DRM-compatible technologies use a conversion method based on a mediator to convert the DRM contents to fit to the DRM loaded on the terminal to which the DRM contents would be transmit. The mediator is a type of the DRM for a predetermined conversion in the EXIM. For example, supposing that the DRM A is loaded on a terminal A and the DRM B is loaded on a terminal B. In order to share the copyrighted contents received from the terminal A that is protected by the DRM A with the terminal B, the copyrighted contents need to be converted into a type of the DRM B. To do end, first, the terminal A converts (exports) contents to which the DRM A is applied into the mediator Next, the terminal B again converts (imports) the mediator converted from the contents to which the DRM A is applied into the contents to which the DRM B is applied. The conversion of the contents may be performed in each terminal and may be performed through a separate server.

The copyrighted contents may be shared using the DRM-compatible technology, but there are burdens that each operator develops the conversion technology that converts the contents into the mediator and converts the converted mediator to the contents. Further, N*N type of conversions (i.e., N*N number of conversions) are necessary to employ the numerous DRM contents and there are many limitation in employing the DRM-compatible technology. Actually, mutually reliable ways are necessary for conversion between DRMs, and when functional difference caused by the different function provided by each DRM exist, it is necessary for the reliable third object to eliminate the functional difference. Consequently, the complex conversion process of the N*N type is required.

SUMMARY OF THE INVENTION

In view of the above, the present invention provides an apparatus for generating contents, which generates the copyrighted contents (hereafter, referred to as "smart Contents") so that the N-screen service for the contents of which copyright needs to be protected may be enabled.

In addition, the present invention provides an apparatus for executing the copyrighted contents shared and distributed through the N-screen service the copyrighted contents.

Further, the present invention provides a method for providing the N-screen service, which supports executing and playing of the contents through the N-Screen service in a network system including the apparatus for generating contents and the apparatus for executing contents.

In accordance with a first aspect of the present invention, there is provided a method for executing the smart contents, the method including: extracting the smart code from the smart contents including a contents protected by a digital right management (DRM) technology, a metadata having information necessary to use the contents and a smart code for protecting copyright of the contents; verifying the extracted smart code; determining whether the verified smart code is a type of executable (or installable) file; interpreting the smart code if the smart code is not the type of the executable file; and executing the interpreted smart code or the smart code in the type of the executable file.

In accordance with a second aspect of the present invention, there is provided a method for executing the smart contents, the method including: extracting the smart code from the smart contents including a contents protected by a digital right management (DRM) technology, a metadata having information necessary to use the contents and a smart code for protecting copyright of the contents; verifying the extracted smart code; determining whether the verified smart code is a type of executable (or installable) file; interpreting the smart code if the smart code is not the type of the executable file; and executing the interpreted smart code or the smart code in the type of the executable file.

In accordance with a third aspect of the present invention, there is provided a method for executing smart contents, the method including: receiving a smart contents including a contents protected by a digital right management (DRM) technology, a metadata having information necessary to use the contents and position information which a smart code for protecting copyright of the contents is downloaded; requesting and receiving the smart code by communicating with a smart code server based on the position information; verifying the received smart code; determining whether the verified smart code is a type of executable (or installable) files; if the smart code is not the type of executable file, interpreting the smart code; and executing the interpreted smart code or the smart code in the type of the executable file.

In accordance with a fourth aspect of the present invention, there is provided a method for providing an N-screen service of smart contents, the method including: a service provider transmitting the smart contents including a contents protected by a digital right management (DRM) technology, a metadata having information necessary to use the contents and a smart code for protecting copyright of the contents to a user terminal of N number of the user terminals that requests the N-screen service; the user terminal receiving the smart contents; the user terminal extracting the smart code from the smart contents to verify the extracted smart code; the user terminal determining whether the smart code is a type of executable (or installable) file; if the smart code is not the type of the executable file, the user terminal interpreting the smart code; the user terminal executing the interpreted smart code or the smart code in the type of the executable file; and a digital right management (DRM) agent executed (or installed) by the smart code transmitting the protected contents to a contents player.

In accordance with the embodiments of the present invention, the contents service providers or contents providers embeds a code (i.e., the smart code) which is capable of protecting copyright of the contents in the protected contents to distribute the protected contents and the user terminal loaded with the smart code execution device that may interpret and execute the smart code may be provided with the N-screen service without loading the additional DRM agent. That is, it is possible to employ various DRM, and there is no need to install the separate DRM for providing the N-screen service.

Therefore, the service provider's business area is expanded in the aspect of the business; business model in the type of N-screen that protects the copyright and employs various terminals may be expanded; the rights and interests of the buyer may protected by guaranteeing contents buyer's right of private reproduction and right of device option; it is possible to enable free contents sharing and consumption if the necessary licenses is obtained; and the contents providers (CP) may apply the copyright protection technology to their won contents, thus profits may be secured.

BRIEF DESCRIPTION OF THE DRAWINGS

The objects and features of the present invention will become apparent from the following description of embodiments given in conjunction with the accompanying drawings, in which:

FIG. 4 is a table showing a configuration of a smart contents generated by the method for generating the copyrighted contents in accordance with the embodiment of the present invention;

DETAILED DESCRIPTION OF THE EMBODIMENTS

Advantages and features of the invention and methods of accomplishing the same may be understood more readily by reference to the following detailed description of embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims.

In the following description of the present invention, if the detailed description of the already known structure and operation may confuse the subject matter of the present invention, the detailed description thereof will be omitted. The following terms are terminologies defined by considering functions in the embodiments of the present invention and may be changed operators intend for the invention and practice. Hence, the terms need to be defined throughout the description of the present invention.

Hereinafter, embodiments of the present invention will be described in detail with reference to the accompanying drawings which form a part hereof.

Figure 1:
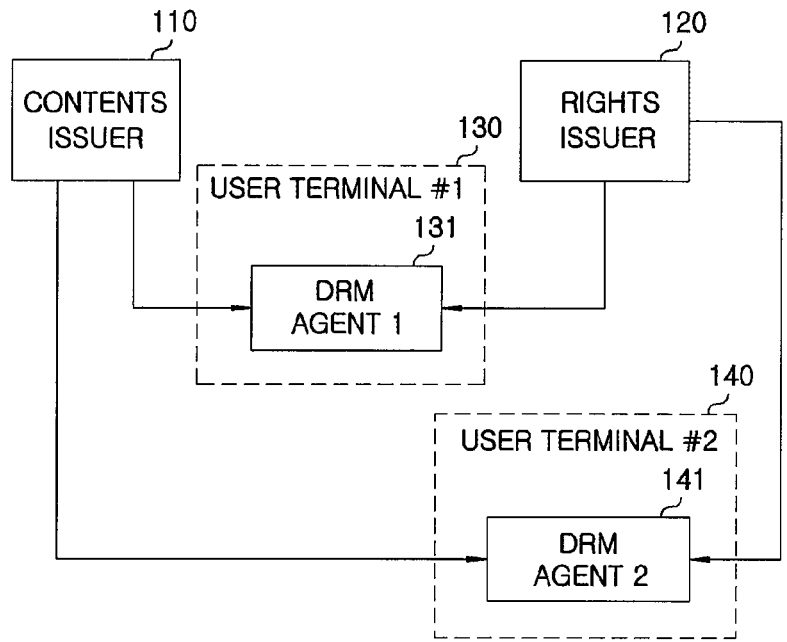
FIG. 1 is a diagram showing configuration of a network for providing a DRM service to copyrighted contents that may be distributed through the N-screen service in accordance with an embodiment of the present invention.

FIG. 1 is a diagram showing a configuration of a network for providing the DRM service to copyrighted contents that may be distributed through the N-screen service in accordance with the embodiment of the present invention.

A contents issuer 110 may encrypt and distribute contents, and generate protected contents (DRM contents) to distribute same to the user terminals 130 and 140.

A rights issuer 120 may generate a rights object including permission information, limitation information, a contents decryption key and the like related to the contents, and then sell the generated rights object to the user terminals 130 and 140. At this time, the sensitive information within the rights object may be encrypted.

The DRM agents 131 and 141 are client modules having a function that the DRM agents 131 and 141 contact with the rights issuer 120 to obtain a permission object (or license) in order to use the protected contents according to the given conditions based on the obtained permission object (or license); and is loaded on each user terminal 130 and 140. The rights object may be obtained through a process of purchasing the contents.

The protected contents may be moved between the user terminals 130 and 140, but the use of the protected contents is allowed after purchasing the rights object from the rights issuer 120.

Figure 2A:
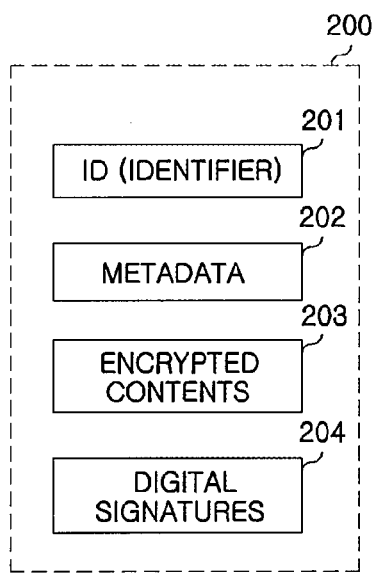
FIGS. 2A and 2B are diagrams showing a configuration of the contents protected by the DRM technology and a type of the right object, respectively.
Figure 2B:
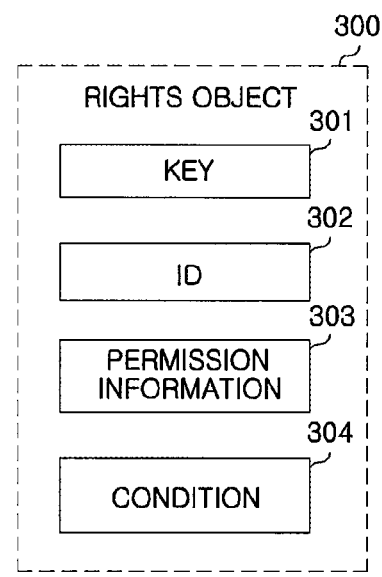

FIGS. 2A and 2B are diagrams showing a configuration of the contents protected by digital rights management (DRM) technology and a type of the rights object, respectively.

The protected contents 200 may be configured as follows. An ID (identifier) 201 may include the ID of the contents. The metadata 202 may include an encryption scheme, a rights issuer's URL, contents provider's information, and the like. The encrypted contents 203 may be referred to as an encrypted data. A digital signature 204 is signed with the private key of the contents provider and may be used to verify contents provider and the integrity.

The type of the rights object 300 is as follows. A Key 301 may store a key used for the encryption of the contents and the like and may generally include a CEK (Contents Encryption Key), but there may be a difference depending on the DRM product.

An ID 302 may include the rights issuer's ID, ID of the contents and the like.

A permission information 303 may include information such as Play, View, Print, Copy, Move, Edit, Extract, Embed and the like.

Further, limit information (condition) 304 may define conditions of using the contents, may include information of period (duration of using the contents), count (the number of usage), trace (monitoring history of user's usage), domain (restricting the contents to specific user or group, or to be used only in certain areas) and the like.

As shown in the FIGS. 1 and 2, in order to provide an N-screen service sharing the copyrighted contents between N number of user terminals, in order for copyright protection, protection and control of the contents and the like, the protected contents having a built-in code for the copyright protection is distributed, each user terminal interprets and executes the built-in code for the copyright protection to protect the copyright of the protected contents. In the description of the embodiment of the present invention, the code for the copyright protection will be referred to "smart code". The smart code may include various type such as a machine language, an assembly language, byte codes and the like, and the type of the smart code may be read, interpreted, and executed by a smart contents executor loaded in each user terminal.

In accordance with the embodiment of the present invention, the distributed contents may be generated by the apparatus for generating the smart contents that is located on the side of a service provider in the type of the smart contents, and the service provider distributes the generated smart contents. The smart contents is a self protection contents including an encrypted contents and the smart code for protecting and controlling the contents, and may be provided through the N-screen service for protecting the copyright independent of the user terminal.

Figure 3:
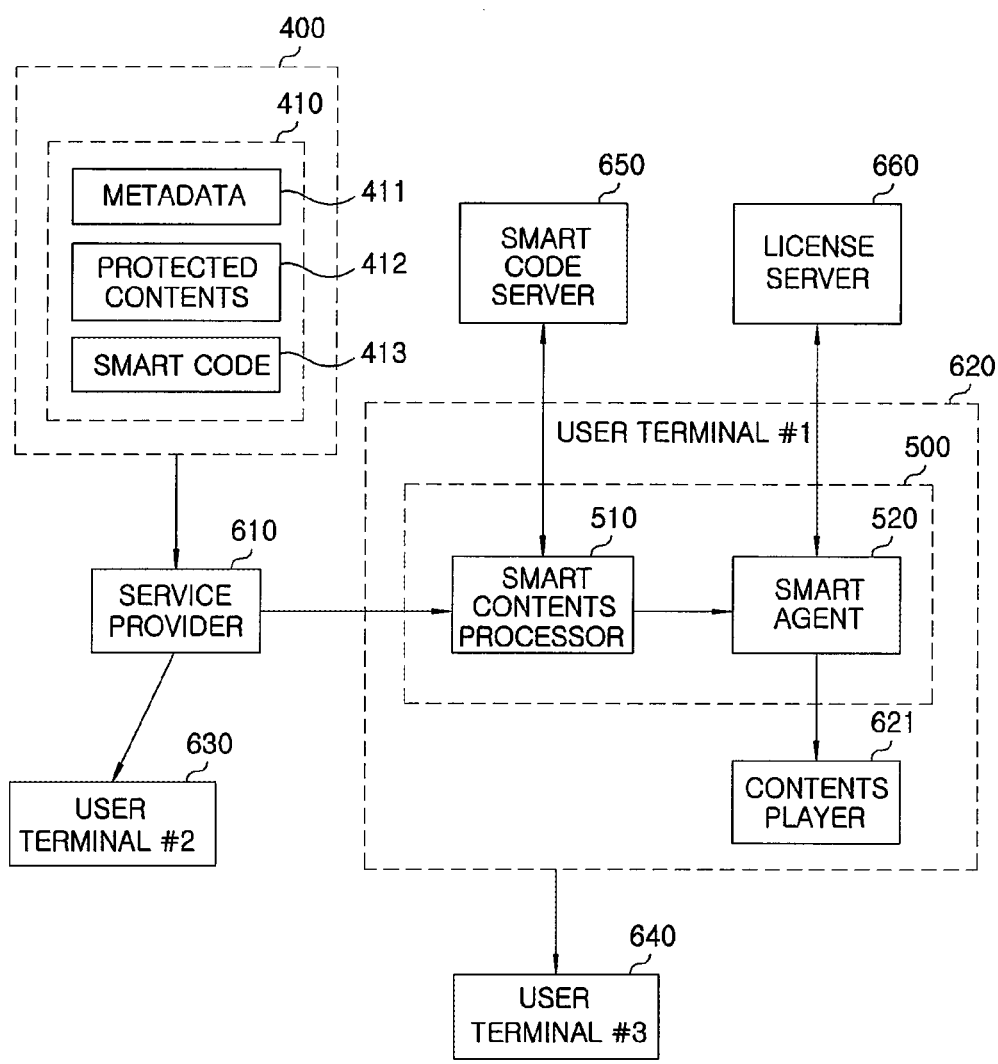
FIG. 3 is a diagram showing a configuration of the network for providing the N-screen service of the DRM contents that the method for generating the copyrighted contents and the method for executing the copyrighted contents may be applied to in accordance with the embodiment of the present invention.
Figure 5:
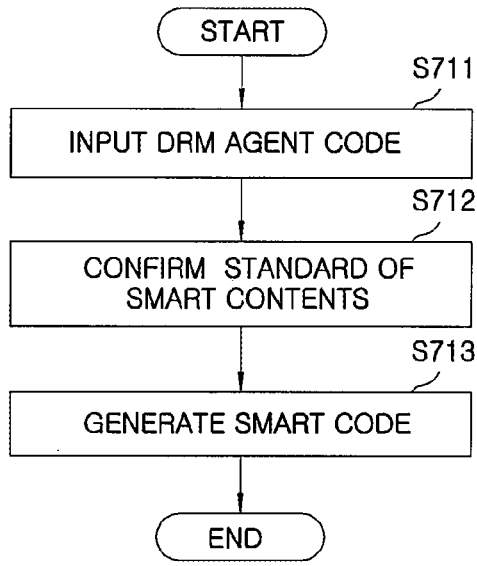
FIG. 5 is a flow chart showing the method for generating the smart contents in accordance with the embodiment of the present invention.

FIG. 3 is a diagram showing a configuration of the network for providing the N-screen service of the DRM contents to which a method for generating the copyrighted contents and a method executing the copyrighted contents may be applied in accordance with the embodiment of the present invention.

An apparatus 400 for generating a smart contents may combine a metadata 411, a protected contents (DRM contents) 412, and a smart code 413, and generate a smart contents 410. The metadata 411 may be a header including information necessary for the use of the smart contents 410. The metadata 411 may include a version, an ID of the smart code 413, and the like. The protected contents 412 is a contents protected by the DRM and may be named as a DRM contents. The smart code 413 is a code for protecting copyright of the DRM contents.

FIG. 4 is a table showing a configuration of the smart contents generated by the method for generating the copyrighted contents in accordance with the embodiment of the present invention. Among each field shown in FIG. 4, the SmartCodeData is the smart code 413, the ProtectedContentData is the protected contents 412, and the rest of the fields are the metadata 411. Further, description of each field is as follows.

Version: version information of the smart contents

CreatorID: an identifier of smart contents generator

SmartCodeType: a type of the smart code (0x01:non executable file, 0x02: executable file, 0x03: installable file, 0x04: URI information)

SmartCodeID: the identifier of the smart code

SmartCodeSize: a size of the smart code

DRMinfo: information of the DRM agent applied in the type of the smart code, which is configured with additional metadata such as a DRM agent identifier, a DRM version and the like.

ContentMediaType: a media type of the protected contents, e.g., video/H.264

DRMContentsize: the size of the protected contents or all the method to know the size such as the start and end point and the like.

ServiceProviderID: the identifier of the SP (Service Provider)

SmartContentAuthType: authentication method of the smart contents (0x01: code signature), and may be defined in various ways depending on the type of authentication method SigningParameter: signature information of the smart contents, which is configured with additional metadata such as signing algorithm, key size, signing mode, other parameter set and the like.

PlayerList: a player list option to allow interworking to drive the DRM contents, and may be used only if the player list to allow the interlocking exists SmartCodeData: smart code data (body)

ProtectedContentData: protected contents (DRM contents) data (body)

SmartContent signature: code signature of the smart contents (signed hash value)

The 'Type' shown in FIG. 4 represents the type of the each field and may be changed by a developer.

Further, 'Unit' represents an unsigned integer, and 'Var' represents that variable data structure may be arbitrarily defined and used.

The method for generating the smart contents using the apparatus 400 for generating the smart contents 410 may emloy various embodiments depending on the type of the smart code, or whether the smart code is inserted or the like.

First, the smart code 413 may be inserted in the smart contents 410 itself as shown in FIG. 3, and may be inserted in the type of location information, and the like that may download the smart code. Here, the location information may be expressed in various ways such as a URL (Uniform Resource Locator) or a URI (Uniform Resource Indicator) or the like.

Further, when the smart code 413 itself is inserted into the smart contents 410, some embodiments may be implemented. First, the smart code separately generated may be used. That is, the smart code serving as the DRM agent may be previously generated to be used. Second, a DRM agent executable (or installable) file may be used. That is, an agent file executable itself or installable to a system may be used, not a type in which an apparatus 500 for executing the smart contents may interpret. Third, a smart code generator for converting a DRM agent code into the smart code may be used. The smart code generator may convert the inputted DRM agent code into the smart code which may be recognized by the apparatus 500 for executing the smart contents. At this time, smart contents specifications for reference that is necessary for the smart code generator to generate the smart code may be required. The smart contents specifications are documents which defines standards of the smart contents that the apparatus 500 for executing the smart contents may interpret. The smart code may be various types such as a machine language, an assembly language, byte codes and the like, and may be a type which the apparatus 500 for executing the smart contents may interpret. The information about the type and operation of the smart code may be defined in the smart contents specifications.

The process of generating the smart code by the smart code generator may include inputting the DRM agent code in steps S711; confirming a standard of the smart contents in steps S712; and converting the DRM agent code according to the standards of the smart contents to generate the smart code in steps S713.

The smart contents 410 generated by the apparatus 400 for generating the smart contents may be transmitted to a service provider 610. The service provider 610 may include various service providers providing the contents such as smart TV operators, IPTV (Internet Protocol Television) operators, OTT (Over the Top) operators, web-based content providers and the like. This service provider 610 may include the apparatus 400 for generating the smart contents. The service provider 610 may transmit the smart contents 410 to a user terminal #1 620 receiving services.

The smart contents may be transmitted by various method such as VOD (video on demand), streaming, download and the like The user terminal #1 620, #2 630, and #3 640 may include various terminals which receives services such as smart TV, set-top equipment for IPTV/cable TV/satellite broadcasting, PC, tablet PC, smartphone and the like, and the smart contents 410 may be directly transmitted and received therebetween.

The smart contents processor 510 of the apparatus 500 for executing the smart contents in the user terminal #1 620 may verify the received smart contents 410, extract a smart code 413 from the smart contents 410, and interpret and execute the extracted smart code 413. The smart contents 410 may be verified using various contents authentication method such as a method of verifying a digital signature of the apparatus 400 for generating the smart contents which generates the smart contents.

The smart code 413 may be converted into an executable file of a smart agent 520 through the verification process described above. The smart agent 520 may perform the function of the DRM agent. Thereafter, the smart contents processor 510 may extract the DRM contents from the protected contents 412 and transmit the extracted DRM contents to the smart agent 520.

Figure 6:
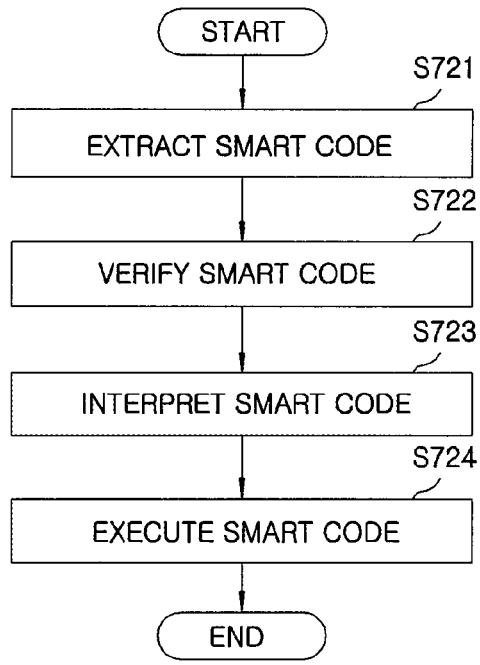
FIG. 6 is a flow chart showing the method for executing the smart contents in accordance with the first embodiment of the present invention.

FIG. 6 is a flow chart showing the method for executing the smart contents in accordance with the first embodiment of the present invention.

Specifically, FIG. 6 shows a process of executing the smart contents when the apparatus 400 for generating the smart contents generates the smart content 410, and the smart code 413 is inserted into the smart contents processor 510 not in the type of an executable file but in the type that of being interpreted by the smart contents processor 510.

As shown in FIG. 6, the method for executing the smart contents may include the smart contents processor 510 extracting the smart code from the smart contents in step S721; verifying the extracted smart code in step S722; determining whether the verified smart code is a form of the DRM agent executable (or installable) file, and if it is determined that the verified smart code is not the executable file, interpreting the smart code in step S723; and executing the interpreted smart code in step S724.

Figure 7:
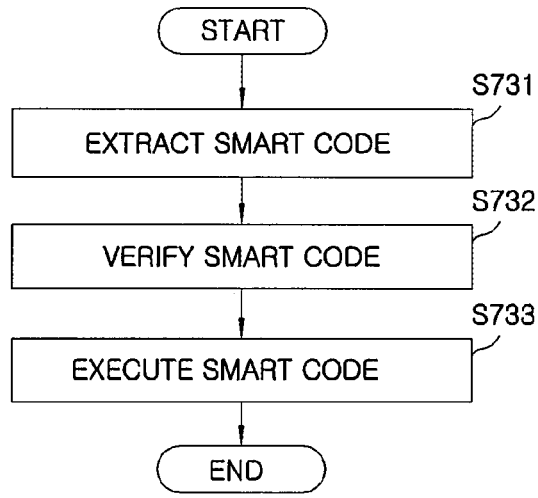
FIG. 7 is a flow chart showing the method for executing the smart contents in accordance with the second embodiment of the present invention.

FIG. 7 is a flow chart showing the method for executing the smart contents in accordance with the second embodiment of the present invention. Specifically, FIG. 6 shows a process of executing the smart contents when the apparatus 400 for generating the smart generates the smart contents 410, and the smart code 413 is inserted into the smart contents processor 510 in the type of being interpreted by the smart contents processor 510.

As shown in FIG. 7, the method for executing the smart contents may include the smart contents processor 510 extracting the smart code from the smart contents in step S731; verifying the extracted smart code in step S732; and executing the verified smart code in the type of the executable file in step S733.

Figure 8:
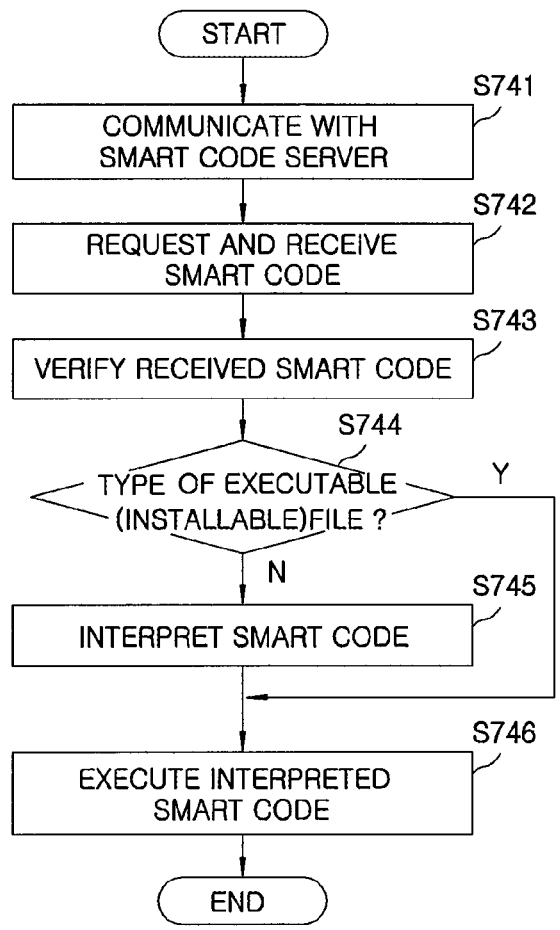
FIG. 8 is a flow chart showing the method for executing the smart contents in accordance with the third embodiment of the present invention.

FIG. 8 is a flow chart showing the method for executing the smart contents in accordance with the third embodiment of the present invention. Specifically, FIG. 8 shows a process of executing the smart contents when the apparatus for generating the smart contents generates the smart contents 410, and the smart code 413 is not inserted directly into the smart contents processor 510 but information of position which may download the smart code is inserted.

As shown in FIG. 8, the method for executing the smart contents may include requesting and receiving, if the smart contents including the position information that may download the smart code is received, the smart code by communicating with the smart code server on the basis of the position information in steps S741 and S742; verifying the received smart code in step S743; determining whether the verified smart code is the type of an executable (or installable) file in step S744; interpreting the smart code in step S745 if it is determined that the smart code is not the executable file in step S744; and executing the interpreted smart code or the smart code in the form of the executable file in step S746.

The smart contents processor 510 may be loaded in the apparatus 500 for executing the smart contents and a user terminal #1 620 in the type of security virtual machine, and the loading position thereof may be different according to the degree of required security. For example, the smart contents processor 510 may be loaded in a safe area of a platform (e.g., integrated into a kernel, loaded in the area of the platform's core library or system library), may be loaded in a contents player 621, or may exist in the type of executable files on a separate application layer.

Comparing with the DRM agent of a conventional DRM system, the function of the smart agent 520 is may be similar to or same as that of the DRM agent of the conventional DRM system. Further, configuration and operation of the DRM agent may be different depending on various DRM standards and commercial products.

The subsequent operation of the smart agent 520 is dependent on what is defined in the smart code, thus may be varied because.

Figure 9:
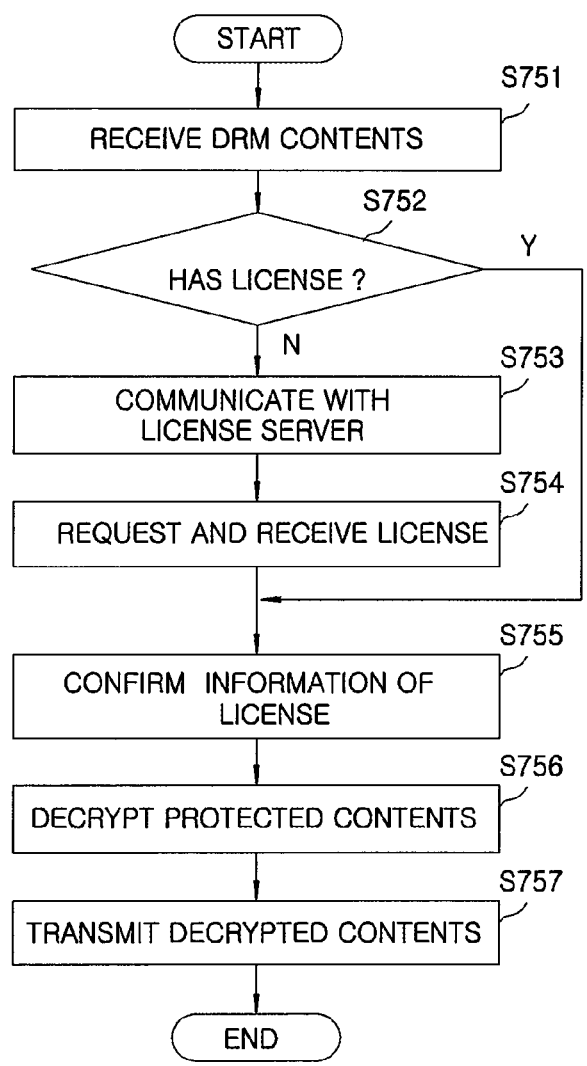
FIG. 9 is a flow chart showing the process of playing the smart contents in accordance with the embodiment of the present invention.

FIG. 9 is a flow chart showing the process of playing the smart contents.

As shown in FIG. 9, the process of playing the smart contents may include receiving the DRM contents and to determine whether the smart agent 520 has a license for playing the protected contents in steps S751 and S752, respectively;

requesting and receiving the license by communicating with the license server if the DRM contents do not have the license in steps S753 and S754;

confirming information of the license and decrypting the protected contents in steps S755 and S756; and transmitting the decrypted contents the contents player in step S757.

The smart agent 520 may determine whether the DRM contents has the license for using the received DRM contents, if not, requests and receives the necessary license by communicating with the license server 660. This means that licensing procedures is performed.

The smart agent 520 received the license may decrypt the DRM contents transmit the decrypted contents to the contents player 621 to drive same after confirming permission information, limit information, and the like. Of course, if the license violates the permission information and the limit information, the smart agent 520 may not decrypt the contents.

The contents player 621 may be different depending on the type of the contents. For example, if the protected contents are a document type, the contents player 621 may be a viewer of the documents, if the protected contents are an image type, the contents player 621 may be an image viewer, and if the protected contents are a video type, the contents player 621 may be a video player.

The smart contents 410 may be distributed through the N-Screen by various methods. Specifically, same contents may be distributed from a server to a plurality of terminals, a terminal received the contents may distribute the received contents to other terminals. Further, the contents may be transmitted and received on a file-by-file basis, or by streaming type.

In accordance with the embodiment of the present invention, when generating, sharing and distributing the smart contents 410 to provide the N-screen service, the smart code may be inserted only into some of the plurality of the smart contents. In this case, the smart contents processor 510 may execute the smart contents 410 into which the smart code 413 is not inserted using the smart code inserted into other smart contents. Alternatively, the smart contents processor 510 may execute the smart contents 410 into which position information that the smart code 413 may be downloaded is not inserted using the position information that has been inserted into other smart contents.

For example, when a user buys a music album including ten audio files, e.g., mp3 or the lime, the smart code may be inserted into the smart contents of the audio file corresponding to the first track, and a user terminal may store the smart code, may generate the smart agent using the smart contents processor to protect copyrights using and may play the audio files through the contents player 621. Further, when the smart code is not inserted the smart contents of the audio file corresponding to the second track but only smart code ID (SmartCodeID field shown in FIG. 4) is represented, the user terminal may receive the smart contents of the second audio file, confirm the smart code ID to determined that the smart agent is already received and loaded. Thereafter, the user terminal may process and play the smart contents using already received and loaded smart agent.

Combinations of each step in respective blocks of block diagrams and a sequence diagram attached herein may be carried out by computer program instructions. Since the computer program instructions may be loaded in processors of a general purpose computer, a special purpose computer, or other programmable data processing apparatus, the instructions, carried out by the processor of the computer or other programmable data processing apparatus, create devices for performing functions described in the respective blocks of the block diagrams or in the respective steps of the sequence diagram.

Since the computer program instructions, in order to implement functions in specific manner, may be stored in a memory useable or readable by a computer aiming for a computer or other programmable data processing apparatus, the instruction stored in the memory useable or readable by a computer may produce manufacturing items including an instruction device for performing functions described in the respective blocks of the block diagrams and in the respective steps of the sequence diagram. Since the computer program instructions may be loaded in a computer or other programmable data processing apparatus, instructions, a series of processing steps of which is executed in a computer or other programmable data processing apparatus to create processes executed by a computer so as to operate a computer or other programmable data processing apparatus, may provide steps for executing functions described in the respective blocks of the block diagrams and the respective sequences of the sequence diagram.

Moreover, the respective blocks or the respective sequences may indicate modules, segments, or some of codes including at least one executable instruction for executing a specific logical function(s). In several alternative embodiments, is noticed that functions described in the blocks or the sequences may run out of order. For example, two successive blocks and sequences may be substantially executed simultaneously or often in reverse order according to corresponding functions.

While the invention has been shown and described with respect to the preferred embodiments, the present invention is not limited thereto. It will be understood by those skilled in the art that various changes and modifications may be made without departing from the scope of the invention as defined in the following claims.

What is claimed is:

1. A method comprising:
    extracting smart code from a file including encrypted content protected by a digital right management (DRM) technology, a metadata having information necessary to use the encrypted content and a smart code for protecting copyright of the contents;
    verifying the extracted smart code;
    determining whether the verified smart code is an executable file or an installable file;
    when the verified smart code is the installable file, interpreting the smart code and executing the interpreted smart code; and
    when the verified smart code is the executable file, executing the executable file,
    wherein the smart code is a DRM agent file.

2. The method of claim 1, further comprising:
    determining whether a smart agent has a license for playing the protected contents;
    if the smart agent does not have the license, requesting and receiving the license by communicating with a license server;
    confirming information of the license to decrypt the protected contents; and
    transmitting the decrypted and protected contents to a content player.

3. A method for executing smart contents, the method comprising:
    receiving a smart contents including a contents protected by a digital right management (DRM) technology, a metadata having information necessary to use the contents and position information which a smart code for protecting copyright of the contents is downloaded;
    requesting and receiving the smart code by communicating with a smart code server based on the position information;
    verifying the received smart code;
    determining whether the verified smart code is an installable file or an executable file;
    when the verified smart code is the installable file, interpreting the smart code and executing the interpreted smart code; and
    when the verified smart code is the executable file, executing the executable file,
    wherein the smart code is a DRM agent file.

4. The method of claim 3, further comprising:
    determining whether a smart agent has a license for playing the protected contents;
    if the smart agent does not have the license, requesting and receiving the license by communicating with a license server;
    confirming information of the license to decrypt the protected contents; and
    transmitting the decrypted and protected contents to a contents player.

5. A method for providing an N-screen service of smart contents, the method comprising:
    a service provider transmitting a file including encrypted content protected by a digital right management (DRM) technology, a metadata having information necessary to use the encrypted content and a smart code for protecting copyright of the encrypted content in accordance with an N-screen service;
    a user terminal receiving the file;
    the user terminal extracting the smart code from the file and verifying the extracted smart code;
    the user terminal determining whether the smart code is an executable file or an installable file;
    when the verified smart code is the installable file, interpreting the smart code and executing the interpreted smart code by the user terminal;
    when the verified smart code is the executable file, executing the executable file by the user terminal; and
    transmitting the protected smart code to a content player.

6. The method of claim 5, wherein the service provider inserts the smart code into only some of the plurality of the smart contents, and
    wherein the user terminal executes the smart contents into which the smart code is not inserted by using the smart code which has been inserted into other smart contents.

7. The method of claim 5, wherein the service provider transmitting the smart contents transmits the smart contents including a contents protected by a digital right management (DRM) technology, a metadata having information necessary to use the contents and position information which a smart code for protecting copyright of the contents is downloaded to the a user terminal of N number of the user terminals that requests the N-screen service.

8. The method of claim 5, wherein the user terminal extracting the smart code from the smart contents to verify the extracted smart code requests and receives the smart code by communicating with a smart code server based on the position information to verify the received smart code.

9. The method of claim 5, wherein the service provider inserts the position information into only some of the plurality of smart contents, and
    wherein the user terminal executes the smart contents into which the smart code is not inserted using the smart code downloaded by using the position information which has been inserted into other smart contents.

* * * * *